United States Patent
Kibayashi et al.

(10) Patent No.: US 11,194,266 B2
(45) Date of Patent: Dec. 7, 2021

(54) DEVELOPING ROLL FOR ELECTROPHOTOGRAPHIC DEVICE

(71) Applicant: Sumitomo Riko Company Limited, Aichi (JP)

(72) Inventors: Tatsuya Kibayashi, Aichi (JP); Yoshihiro Saito, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 17/225,108

(22) Filed: Apr. 8, 2021

(65) Prior Publication Data

US 2021/0223714 A1 Jul. 22, 2021

Related U.S. Application Data

(63) Continuation of application No. PCT/JP2020/007322, filed on Feb. 25, 2020.

(30) Foreign Application Priority Data

Mar. 27, 2019 (JP) .............................. JP2019-060235

(51) Int. Cl.
*G03G 15/08* (2006.01)

(52) U.S. Cl.
CPC ..... *G03G 15/0818* (2013.01); *G03G 15/0806* (2013.01); *G03G 15/0808* (2013.01); *G03G 2215/0858* (2013.01); *G03G 2215/0861* (2013.01)

(58) Field of Classification Search
CPC .......... G03G 15/0806; G03G 15/0808; G03G 15/0818; G03G 2215/0858; G03G 2215/0861
See application file for complete search history.

(56) References Cited

U.S. PATENT DOCUMENTS

| 6,096,395 | A | * | 8/2000 | Hayashi | ............. B29C 44/1242 399/176 |
| 9,952,531 | B2 | | 4/2018 | Ishii et al. | |
| 2020/0041928 | A1 | * | 2/2020 | Tsuru | ................. G03G 15/0233 |

FOREIGN PATENT DOCUMENTS

| JP | 4442812 | | 3/2010 |
| JP | 2012241735 | A * | 12/2012 |
| JP | 2017201390 | | 11/2017 |

OTHER PUBLICATIONS

"International Search Report (Form PCT/ISA/210) of PCT/JP2020/007322," dated Apr. 14, 2020, with English translation thereof, pp. 1-5.

\* cited by examiner

*Primary Examiner* — Joseph S Wong
(74) *Attorney, Agent, or Firm* — JCIPRNET

(57) ABSTRACT

Provided are a developing roll for an electrophotographic device and a method for manufacturing a developing roll for an electrophotographic device, with which toner fusion and toner filming are suppressed. A developing roll for an electrophotographic device includes a shaft body and an elastic body layer formed on an outer circumference of the shaft body. The surface of the elastic body layer has a plurality of large protruding parts having a width of 3.0 to 12 μm and a height of 3.0 to 12 μm, and the side surface of the large protruding part 16 has a plurality of small protruding parts which form convex-concavity having a ten-point average roughness Rz of 2.0 to 4.0 μm.

1 Claim, 3 Drawing Sheets

(a)

(b)

DEVELOPING ROLL FOR ELECTROPHOTOGRAPHIC DEVICE

CROSS-REFERENCE TO RELATED APPLICATION

The present application is a continuation of PCT/JP2020/007322, filed on Feb. 25, 2020, and is related to and claims priority from Japanese patent application no. 2019-060235, filed on Mar. 27, 2019. The entire contents of the aforementioned application are hereby incorporated by reference herein.

BACKGROUND

Technical Field

The present disclosure relates to a developing roll for an electrophotographic device which is suitably used in an electrophotographic device such as a copier, a printer, a facsimile and the like that employs an electrophotographic method, and relates to a method for manufacturing a developing roll for an electrophotographic device.

Description of Related Art

In an electrophotographic device, a developing roll has a role of carrying the amount of toner necessary for printing to a photoreceptor. Roughness is imparted to the surface of the developing roll in order to secure the conveyance amount of the toner. For example, in patent literature 1 (Japanese Patent No. 4442812), roughness is imparted to the surface of the rubber elastic layer by polishing the surface of a rubber elastic layer of the developing roll. Further, for example, in patent literature 2 (Japanese Patent Application Laid-open No. 2017-201390), a surface layer comprising alumina particles and resin is surface-treated by irradiation with ultraviolet rays or the like, a plurality of protruding parts comprising alumina particles and resin are formed on the surface of the surface layer, and some of the alumina particles are exposed at the protruding part, thereby imparting roughness to the surface of the surface layer of a developing member.

If the surface of the developing roll is not imparted with appropriate roughness, the ground contact area with the photoreceptor or a layer-forming blade becomes large, and toner fusion (toner filming) occurs on the photoreceptor or the layer-forming blade due to physical pressing. The method of imparting roughness to the surface of the developing roll includes a method of blending particles that form roughness into the surface layer, a method of transferring the roughness of the inner surface of a molding die to the surface of the rubber elastic layer, a method of polishing the surface of the rubber elastic layer, and the like. In the method of blending particles that form roughness into the surface layer, protruding parts where the particles exist are easily scraped, and the toner is easily fused from this point. Further, in any of the methods, the toner is easily fused because the toner is deposited in recessed parts between the protruding parts.

SUMMARY

The disclosure provides a developing roll for an electrophotographic device and a method for manufacturing a developing roll for an electrophotographic device.

According to one embodiment of the disclosure, a developing roll for an electrophotographic device is provided and may include a shaft body and an elastic body layer formed on an outer circumference of the shaft body. The surface of the elastic body layer has a plurality of large protruding parts having a width of 3.0 to 12 μm and a height of 3.0 to 12 μm, and a side surface of the large protruding part has a plurality of small protruding parts which form convex-concavities having a ten-point average roughness Rz of 2.0 to 4.0 μm.

According to another embodiment of the disclosure, a method for manufacturing a developing roll for an electrophotographic device is provided and may include: a step of forming a base layer, which comprises a polymer having a carbon-carbon double bond and has a plurality of large protruding parts having a width of 3.0 to 12 μm and a height of 3.0 to 12 μm on a surface of the base layer, on an outer circumference of a shaft body; and a step of impregnating the surface of the base layer with chlorinated isocyanuric acid, and curing the surface of the base layer impregnated with the chlorinated isocyanuric acid so as to form a plurality of small protruding parts which form convex-concavities having a ten-point average roughness Rz of 2.0 to 4.0 μm on a side surface of the large protruding part.

DESCRIPTION OF THE EMBODIMENTS

Figure 1:
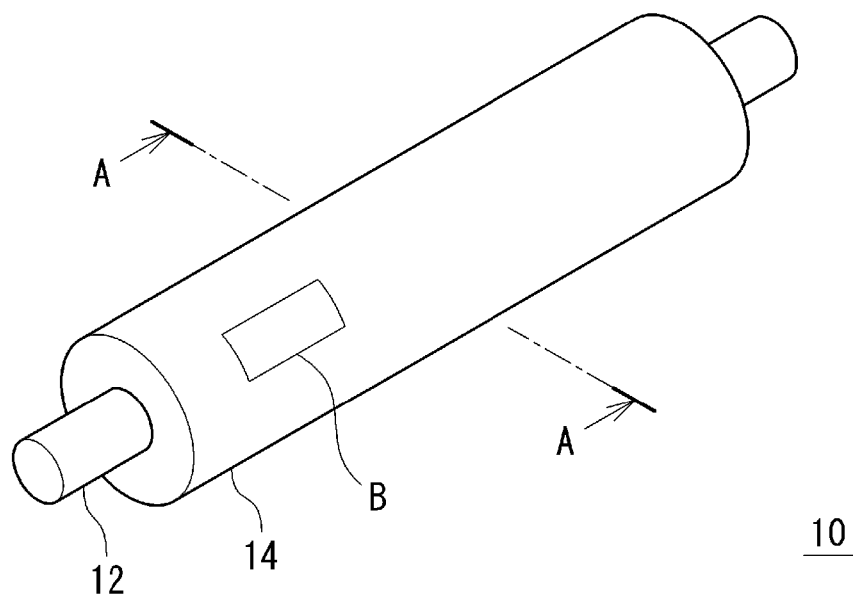
FIG. 1 shows a developing roll for an electrophotographic device according to an embodiment of the present disclosure, in which (a) is a schematic external view and (b) is a cross-sectional view thereof taken along line A-A.
Figure 1:
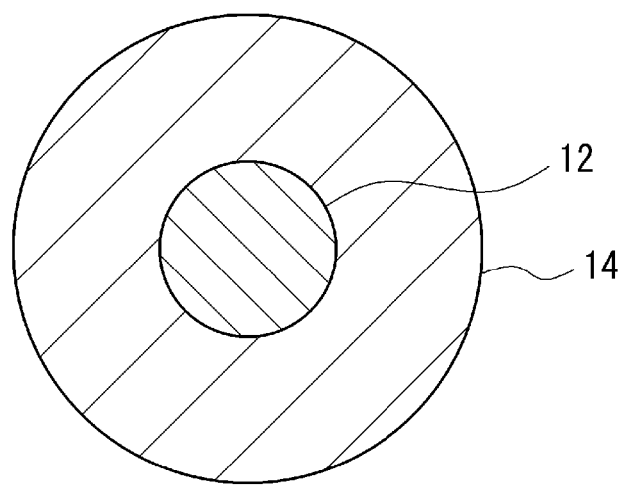
Figure 2:
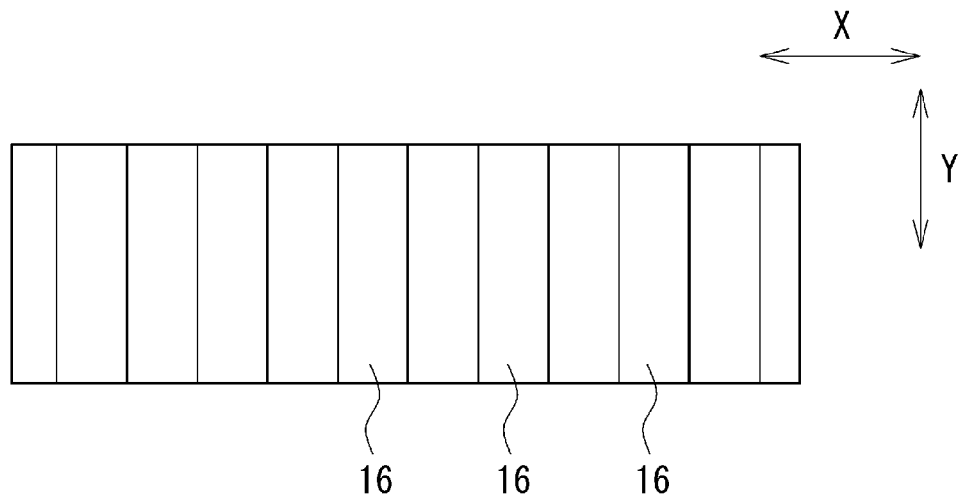
FIG. 2 is an enlarged view of a part B of the surface of the developing roll for an electrophotographic device shown in FIG. 1, including a plan view (a) and a cross-sectional view (b).
Figure 2:
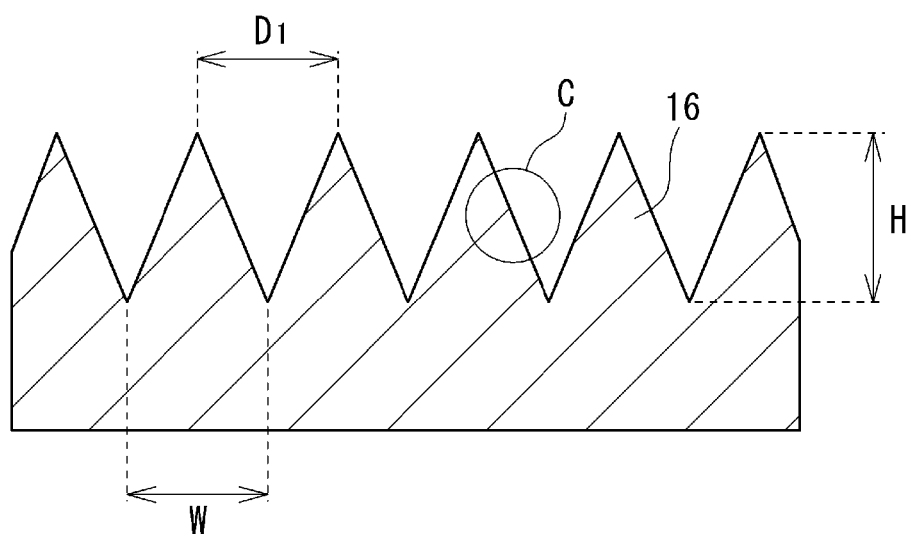
Figure 3:
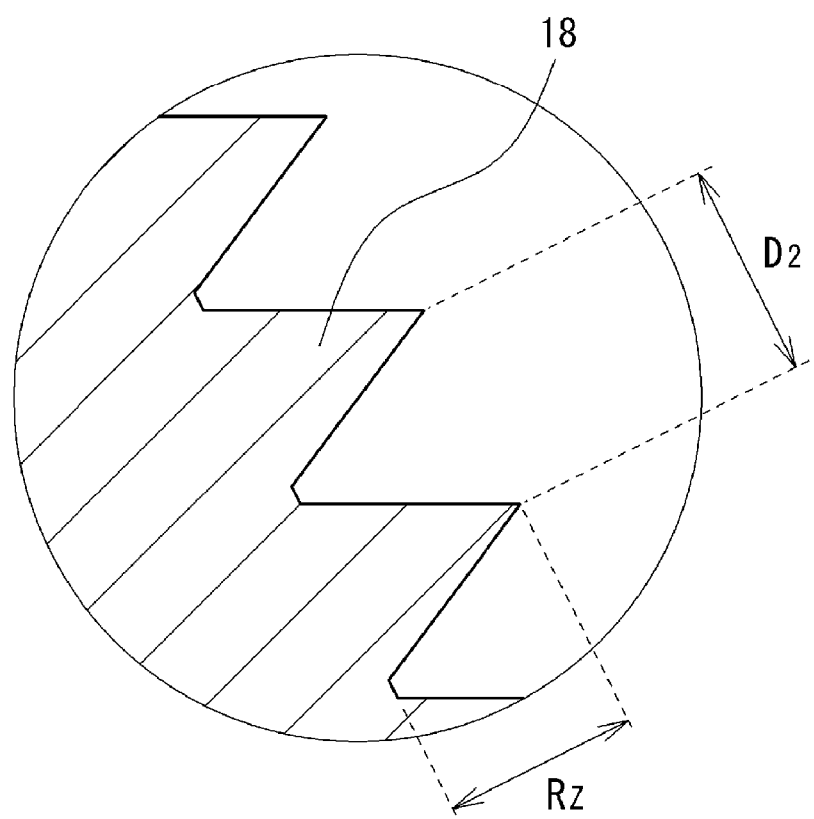
FIG. 3 is a further enlarged view of a part C of the cross section shown in (b) of FIG. 2.

A developing roll for an electrophotographic device according to the present disclosure (hereinafter, sometimes simply referred to as a developing roll) is described in detail. FIG. 1 is an overall view of the developing roll according to one embodiment and a cross-sectional view thereof taken along line A-A, FIG. 2 is an enlarged view of a part B of the surface of an elastic body layer, and FIG. 3 is an enlarged view of a part C of the part B of the surface. In FIG. 2, the X direction is an axial direction of the developing roll, and the Y direction is a circumferential direction of the developing roll.

A developing roll 10 includes a shaft body 12 and an elastic body layer 14 formed on the outer circumference of the shaft body 12. The elastic body layer 14 is a layer (base layer) that is a base of the developing roll 10. The elastic body layer 14 is a layer (outermost layer) that appears on the surface of the developing roll 10 in a radial direction. In addition, although not particularly shown, an intermediate layer such as a resistance-adjusting layer or the like may be arranged between the shaft body 12 and the elastic body layer 14, if necessary.

As shown in FIG. 2, the developing roll 10 has a plurality of large protruding parts 16 having a width W of 3.0 to 12 μm and a height H of 3.0 to 12 μm on the surface of the elastic body layer 14. As shown in FIG. 2, the plurality of large protruding parts 16 are protruding parts having a triangular cross section, and are linear protruding parts (projecting stripes) continuous in a circumferential direction (Y direction in (a) of FIG. 2). The developing roll 10 is excellent in toner transferability by having a plurality of large protruding parts 16 having the width and height described above on the surface of the elastic body layer 14. In addition, the ground contact area with a photoreceptor or a layer-forming blade is reduced, and toner fusion (toner filming) to the photoreceptor and the layer-forming blade due to physical pressing is suppressed. If there is no large protruding part 16 on the surface of the elastic body layer 14 and the surface roughness of the elastic body layer 14 is small, the conveyance amount of the toner is small and toner filming is likely to occur. A distance $D_1$ between the large protruding part 16 and the large protruding part 16 is not particularly limited, but may be 6.0 to 9.0 If the distance $D_1$ between the two adjacent large protruding parts 16 is within the above range, appropriate toner transferability can be ensured.

The width W of the large protruding part 16 may be 4.0 to 11.0 Further, the height H of the large protruding part 16 may be 4.0 to 10.0 Further, the distance $D_1$ between the large protruding part 16 and the large protruding part 16 further may be 7.0 to 18.0 μm.

As shown in FIG. 2 and FIG. 3, the side surface of the large protruding part 16 has a plurality of small protruding parts 18 which form convex-concavities having a ten-point average roughness Rz of 2.0 to 4.0 μm. The plurality of small protruding parts 18 include wrinkles formed on the side surface of the large protruding part 16. In the developing roll 10, by having a plurality of small protruding parts 18 having the size described above on the side surface of the large protruding part 16, toner which has entered between the large protruding parts 16 is suppressed from adhering between the large protruding parts 16 and depositing in this state, and the toner fusion to the developing roll 10 is suppressed. It is presumed that the reason is the lotus effect obtained by the plurality of small protruding parts 18 arranged on the side surface of the large protruding part 16. Because the ten-point average roughness Rz of the side surface of the large protruding part 16 determined by the plurality of small protruding parts 18 is 2.0 to 4.0 in general, it becomes difficult for toner having a particle size of 5.0 to 14 μm to stay between the large protruding parts 16. A distance $D_2$ between the small protruding part 18 and the small protruding part 18 is not particularly limited, but may be 1.0 to 5.0 If the distance $D_2$ between the two adjacent small protruding parts 18 is 5.0 μm or less, it becomes difficult for toner to enter between the small protruding parts 18, so that the effect of suppressing the toner fusion to the developing roll 10 due to the lotus effect is likely to be exhibited.

The elastic body layer 14 having a plurality of large protruding parts 16 and a plurality of small protruding parts 18 can be produced as follows.

First, a base layer that comprises a polymer having a carbon-carbon double bond and has a plurality of large protruding parts 16 having a width of 3.0 to 12 μm and a height of 3.0 to 12 μm on the surface is formed on the outer circumference of the shaft body 12.

The plurality of small protruding parts 18 are not yet formed on the side surface of the large protruding part 16 of the base layer. The base layer can be produced by molding a rubber composition for forming an elastic body layer that comprises the polymer having a carbon-carbon double bond with a die and then polishing the surface of the obtained rubber layer. The large protruding part 16 may be polished along the circumferential direction in order to be made into a linear protruding part (projecting stripe) continuous in the circumferential direction. Further, for example, by using a wedge-shaped polishing material, the large protruding part 16 can be made into a protruding part having a triangular cross section. The large protruding part 16 of the base layer may be formed by imparting a predetermined roughness to the inner surface of a die and transferring the roughness of the inner surface of the die in die-molding.

Next, the surface of the base layer is impregnated with chlorinated isocyanuric acid, and the surface of the base layer impregnated with the chlorinated isocyanuric acid is cured to form the plurality of small protruding parts 18 which form convex-concavities having a ten-point average roughness Rz of 2.0 to 4.0 μm on the side surface of the large protruding part 16.

When the surface of the base layer that has a plurality of large protruding parts 16 having a predetermined size is impregnated with the chlorinated isocyanuric acid, the impregnated region of the base layer expands. Then, when the surface of the base layer impregnated with the chlorinated isocyanuric acid is cured, the impregnated region of the base layer shrinks. At this time, a shrinkage difference is generated between the surface and the inside, and the inside shrinks more than the surface. Thereby, wrinkles are generated on the surface, and a plurality of wrinkled small protruding parts 18 are formed on the side surface of the large protruding part 16. The generation of the wrinkles caused by the shrinkage difference occurs by impregnating the base layer having a plurality of large protruding parts 16 with the chlorinated isocyanuric acid. Even if a rubber layer not having a plurality of large protruding parts 16 is impregnated with the chlorinated isocyanuric acid, the wrinkles are not observed. Further, even if the base layer having a plurality of large protruding parts 16 is impregnated with a compound other than the chlorinated isocyanuric acid, for example, isocyanate, the wrinkles are not observed.

The base layer can be impregnated with the chlorinated isocyanuric acid by using a surface treatment liquid comprising the chlorinated isocyanuric acid. The chlorinated isocyanuric acid may be monochloroisocyanuric acid, dichloroisocyanuric acid, trichloroisocyanuric acid, and salts thereof. The surface treatment liquid may comprise a solvent for dissolving or dispersing chlorinated isocyanuric acid. The solvent for dissolving chlorinated isocyanuric acid may be ethyl acetate, toluene, methyl ethyl ketone (MEK), acetone, and the like. The solvent for dispersing chlorinated isocyanuric acid may be tert-butyl alcohol (TBA) and the like. One or two kinds of the solvent for dissolving chlorinated isocyanuric acid and one kind of the solvent for dispersing chlorinated isocyanuric acid may be used in combination. Toluene and methyl ethyl ketone may be used as the solvent for dissolving chlorinated isocyanuric acid, from viewpoints of high polarity and easy formation of the plurality of wrinkled small protruding parts 18. The magnitude of the ten-point average roughness Rz on the side surface of the large protruding part 16 can be adjusted according to the amount of impregnation of the chlorinated isocyanuric acid, the amount of the solvent for diluting the chlorinated isocyanuric acid, solvent types, and the like. For example, if a solvent having a high polarity is used as the solvent for dissolving chlorinated isocyanuric acid, the impregnation depth becomes deep, the shrinkage difference between the surface and the inside becomes large, and the ten-point average roughness Rz tends to be large.

The surface treatment liquid may comprise a modifying component such as a silicone compound or a fluorine-containing compound that lowers the tackiness of the surface of the elastic body layer 14. The silicone compound or the fluorine-containing compound may be bonded with the polymer component of the elastic body layer 14 by a chemical bond. The silicone compound may be a silicone compound having a carbon-carbon double bond, a fluorine-containing compound having a carbon-carbon double bond, and the like. In order to chemically bond the silicone compound having a carbon-carbon double bond or the fluorine-containing compound having a carbon-carbon double bond with the polymer component of the elastic body layer 14, dichloroisocyanuric acid or trichloroisocyanuric acid may be used as the chlorinated isocyanuric acid, or a photopolymerization initiator may be used.

The silicone compound having a carbon-carbon double bond may be an acrylic monomer having a silicone group. The acrylic monomer represents (meth)acrylate and (meth)acrylamide. (Meth)acrylate is a general term for acrylate and methacrylate. (Meth)acrylamide is a general term for acrylamide and methacrylamide.

The silicone group may be a dimethyl silicone group, a diethyl silicone group, a diphenyl silicone group, and the like. As the silicone compound having a carbon-carbon double bond, those having a number average molecular weight within a range of 200 to 30000 can be used.

The fluorine-containing compound having a carbon-carbon double bond may be an acrylic monomer having a fluorine-containing group. The acrylic monomer represents (meth)acrylate and (meth)acrylamide. (Meth)acrylate is a general term for acrylate and methacrylate. (Meth)acrylamide is a general term for acrylamide and methacrylamide.

The fluorine-containing group may be fluoroalkyl groups having 1 to 20 carbon atoms. The fluoroalkyl group may be a perfluoroalkyl group in which all hydrogen atoms of the alkyl group are substituted with fluorine atoms, or a fluoroalkyl group in which a part of hydrogen atoms of the alkyl group is substituted with fluorine atoms. The fluoroalkyl group having 1 to 20 carbon atoms may be a trifluoromethyl group, a pentafluoroethyl group, a heptafluoropropyl group, a nonafluorobutyl group, a trifluoroethyl group, a pentafluoropropyl group, a heptafluorobutyl group, and the like.

The photopolymerization initiator is not particularly limited as long as it initiates photopolymerization of a photopolymerizable compound, and may be, for example, photopolymerization initiators such as alkylphenones, acetophenones, benzoin ethers, benzophenones, thioxanthones, anthraquinones, benzyls, biacetyls, and the like. Specifically, for example, the photopolymerization initiator may be benzil dimethyl ketal, 2-hydroxy-2-methyl-1-phenyl-propane-1-one, methyl-O-benzoyl benzoate, 1-hydroxycyclohexylphenyl ketone, and the like.

The content of the photopolymerization initiator in the surface treatment liquid may be in a range of 10 to 100 parts by mass and further may be in a range of 10 to 20 parts by mass, with respect to 1 part by mass of the silicone compound having a carbon-carbon double bond and the fluorine-containing compound having a carbon-carbon double bond.

The impregnation method of the surface treatment liquid is not particularly limited, and a dipping method, a roll coating method, a spray coating method and the like can be used. The temperature of the surface treatment liquid in a surface treatment is not particularly limited, and may be appropriately selected from room temperature to about 100° C. The contact time of the surface treatment liquid is not particularly limited, and may be appropriately selected from a few seconds to about a few hours.

If the base layer comprising the polymer having a carbon-carbon double bond is impregnated with the surface treatment liquid, the chlorinated isocyanuric acid undergoes an addition reaction to the carbon-carbon double bond at room temperature, and the isocyanuric acid skeleton is bonded to the polymer of the base layer. When the surface treatment liquid comprises both the chlorinated isocyanuric acid and the silicone compound having a carbon-carbon double bond or the fluorine-containing compound having a carbon-carbon double bond, if the base layer comprising the polymer having a carbon-carbon double bond is impregnated with the surface treatment liquid, the chlorinated isocyanuric acid also undergoes an addition reaction to the carbon-carbon double bond of the silicone compound or fluorine-containing compound, and the silicone compound or the fluorine-containing compound is bonded to the polymer of the base layer via the isocyanuric acid skeleton that is bonded to the polymer of the base layer. Further, if a photopolymerization initiator is blended, the polymer having a carbon-carbon double bond in the base layer and the silicone compound having a carbon-carbon double bond or the fluorine-containing compound having a carbon-carbon double bond undergo a cross-linking reaction, and the silicone compound or the fluorine-containing compound is bonded directly to the polymer on the surface of the base layer. Thereby, the tackiness of the surface of the elastic body layer 14 can be lowered. Then, because the tackiness of the surface of the elastic body layer 14 is lowered, the effect of suppressing toner filming is improved.

The polymer having a carbon-carbon double bond may be isoprene rubber (IR), butadiene rubber (BR), acrylonitrile butadiene rubber (NBR), styrene butadiene rubber (SBR), chloroprene rubber (CR), butyl rubber (IIR), ethylene propylene diene rubber (EPDM), natural rubber (NR), and the like. Among these rubbers, isoprene rubber (IR), butadiene rubber (BR), and acrylonitrile butadiene rubber (NBR) may be used.

In the rubber composition for forming the elastic body layer, a conventionally known conductive agent such as carbon black, graphite, $c$-$TiO_2$, $c$-$ZnO$, $c$-$SnO_2$ ($c$-means conductivity), an ionic conductive agent (quaternary ammonium salt, borate, surfactant, etc.), and the like can be appropriately added in order to impart conductivity, if necessary. Further, various additives may be appropriately added if necessary. The additive may be a lubricant, a vulcanization accelerator, an anti-aging agent, a light stabilizer, a viscosity modifier, a processing aid, a flame retardant, a plasticizer, a foaming agent, a filler, a dispersant, a defoaming agent, a pigment, a mold releasing agent, and the like.

A crosslinking agent may be a resin crosslinking agent, a sulfur crosslinking agent, a peroxide crosslinking agent, and a dechlorination crosslinking agent. These crosslinking agents may be used alone or in combination of two or more.

The resin crosslinking agent may be conventionally known resin crosslinking agents such as phenol resin, urea resin, amino resin, guanamine resin, xylene resin, unsaturated polyester resin, diallyl phthalate resin, epoxy resin, urethane resin, and the like.

The sulfur crosslinking agent may be conventionally known sulfur crosslinking agents such us powdered sulfur, precipitated sulfur, colloidal sulfur, surface-treated sulfur, insoluble sulfur, sulfur chloride, a thiuram vulcanization accelerator, high polymer polysulfide, and the like.

The peroxide crosslinking agent may be conventionally known peroxide crosslinking agents such as peroxyketal, dialkyl peroxide, peroxyester, ketone peroxide, peroxy dicarbonate, diacyl peroxide, hydroperoxide, and the like.

The dechlorination crosslinking agent may be a dithiocarbonate compound.

More specifically, the dechlorination crosslinking agent may be quinoxaline-2,3-dithiocarbonate, 6-methylquinoxaline-2,3-dithiocarbonate, 6-isopropylquinoxaline-2,3-dithiocarbonate, 5,8-dimethylquinoxaline-2,3-dithiocarbonate, and the like.

From the viewpoint of being difficult to bleed, the blending amount of the crosslinking agent may be in a range of 0.1 to 2 parts by mass, further may be in a range of 0.3 to 1.8 parts by mass, and further more may be in a range of 0.5 to 1.5 parts by mass with respect to 100 parts by mass of uncrosslinked rubbers.

When the dechlorination crosslinking agent is used as the crosslinking agent, a dechlorination crosslinking accelerator may be used in combination. The dechlorination crosslinking accelerator may be 1,8-diazabicyclo (5,4,0) undecene-7 (hereinafter abbreviated as DBU) or a weak acid salt thereof. The dechlorination crosslinking accelerator may be used in the form of DBU, but the dechlorination crosslinking accelerator may be used in the form of the weak acid salt of DBU from the viewpoint of handling the dechlorination crosslinking accelerator. The weak acid salt of DBU may be carbonate, stearate, 2-ethylhexylate, benzoate, salicylate, 3-hydroxy-2-naphthoate, phenol resin salt, 2-mercaptobenzothiazole salt, 2-mercaptobenzimidazole salt, and the like.

From the viewpoint of being difficult to bleed, the content of the dechlorination crosslinking accelerator may be in a range of 0.1 to 2 parts by mass, further may be in a range of 0.3 to 1.8 parts by mass, and further more may be in a range of 0.5 to 1.5 parts by mass with respect to 100 parts by mass of uncrosslinked rubbers.

In the elastic body layer 14, a conventionally known conductive agent such as carbon black, graphite, c-$TiO_2$, c-ZnO, c-$SnO_2$ (c-means conductivity), an ionic conductive agent (quaternary ammonium salt, borate, surfactant, etc.), and the like can be appropriately added in order to impart conductivity. Further, various additives may be appropriately added if necessary. The additive may be a lubricant, a vulcanization accelerator, an anti-aging agent, a light stabilizer, a viscosity modifier, a processing aid, a flame retardant, a plasticizer, a foaming agent, a filler, a dispersant, a defoaming agent, a pigment, a mold releasing agent, and the like.

The elastic body layer 14 can be adjusted to a predetermined volume resistivity by the type of the crosslinked rubber, the blending amount of the ionic conductive agent, the blending of an electronic conductive agent, and the like. The volume resistivity of the elastic body layer 14 may be appropriately set in a range of $10^2$ to $10^{10} \Omega \cdot cm$, $10^3$ to $10^9 \Omega \cdot cm$, $10^4$ to $10^8 \Omega \cdot cm$ or the like depending on the application and the like.

The thickness of the elastic body layer 14 is not particularly limited, and may be appropriately set within a range of 0.1 to 10 mm depending on the application and the like.

The elastic body layer 14 has a large surface area by having a plurality of large protruding parts 16 and a plurality of small protruding parts 18. The surface area ratio $S/S_0$ of the elastic body layer 14 may be 5.0 to 8.0, and further may be 6.0 to 8.0. Here, S is a measured surface area of the elastic body layer 14, and $S_0$ is a theoretical surface area when the surface of the elastic body layer 14 is a flat surface.

Because the elastic body layer 14 is characterized by the surface convex-concave shape thereof, in order to maintain the surface convex-concave shape of the elastic body layer 14, it may be that a layer (surface layer) covering the surface of the elastic body layer 14 is not arranged.

The shaft body 12 is not particularly limited as long as it has conductivity. Specifically, a core metal including a solid body or a hollow body which is made of iron, stainless steel, aluminum or the like can be exemplified. If necessary, an adhesive, a primer, or the like may be applied to the surface of the shaft body 12. That is, the elastic body layer 14 may be adhered to the shaft body 12 via an adhesive layer (primer layer). The adhesive, the primer and the like may be made conductive as necessary.

According to the developing roll 10 having the above configuration, because the surface of the elastic body layer 14 has a plurality of large protruding parts 16 having a width of 3.0 to 12 μm and a height of 3.0 to 12 μm and the side surface of the large protruding part 16 has a plurality of small protruding parts 18 which form the convex-concavities having a ten-point average roughness Rz of 2.0 to 4.0 toner fusion and toner filming can be suppressed.

Although embodiments of the present disclosure have been described above, the present disclosure is not limited to the above embodiments, and various modifications can be made without departing from the spirit of the present disclosure.

For example, in the above embodiments, the plurality of large protruding parts 16 are protruding parts having a triangular cross section, but the cross-sectional shape of the large protruding part 16 is not limited to the triangular shape. Further, in the above embodiments, the plurality of large protruding parts 16 are linear protruding parts (projecting stripes) continuous in the circumferential direction, but the plurality of large protruding parts 16 may also be linear protruding parts (projecting stripes) continuous in directions other than the circumferential direction, or may be non-linear protruding parts that are not continuous in a predetermined direction. Further, in the above embodiments, there is no flat part between a large protruding part 16 and the adjacent large protruding part 16, but a flat part may exist between a large protruding part 16 and the adjacent large protruding part 16. Further, the flat part, that is, the surface of the bottom of the groove between a large protruding part 16 and the adjacent large protruding part 16 may have a plurality of small protruding parts 18 which form convex-concavities of Rz 2.0 to 4.0 μm.

Further, in the above embodiments, the plurality of small protruding parts 18 include wrinkles formed on the side surface of the large protruding part 16, but the plurality of small protruding parts 18 may also be protruding parts having a shape other than wrinkle. Further, the plurality of small protruding parts 18 may be formed into projecting stripes extending along the circumferential direction on the side surface of the large protruding part 16 which is a projecting stripe.

EXAMPLES

Hereinafter, the present disclosure is described in detail with reference to examples and comparison examples.

Examples 1 to 10

<Preparation of Rubber Composition for Forming Elastic Body Layer>

With respect to 100 parts by mass of NBR ("Nipol DN3335" manufactured by Zeon Corporation), 1.0 part by mass of a peroxide crosslinking agent ("Perhexa 25B" manufactured by NOF Corporation), 1.0 part by mass of an ionic conductive agent (tetra n-butylammonium perchlorate), and 1.0 part by mass of carbon black ("Seast 116" manufactured by Tokai Carbon Co., Ltd.) were added, and these were stirred and mixed by a stirrer to prepare a rubber composition for forming an elastic body layer.

<Production of Base Layer>

A core metal (shaft body, diameter 6 mm) was set in a molding die (pipe-like), the above rubber composition for forming an elastic body layer was injected, heated at 170° C. for 30 minutes, cooled and demolded, and then a rubber layer having a thickness of 5 mm was formed on the outer circumference of the core metal. Next, by polishing the entire axial direction of the rubber layer in the circumferential direction of the rubber layer, linear protruding parts (large protruding parts) in which the protruding part having a triangular cross section is continuous in the circumferential direction as shown in FIG. 2 were formed on the surface of the rubber layer. Thereby, a roll body in which the outer circumference of the core metal has a base layer having predetermined large protruding parts was produced. The values of width W, height H, and interconvex distance $D_1$ of the large protruding part in the base layer are as shown in table 2.

<Preparation of Surface Treatment Liquid>

A surface treatment liquid comprising trichloroisocyanuric acid or a surface treatment liquid comprising isocyanate was produced so as to have the blending composition (part by mass) shown in table 1.

C=C bond comprising silicone oil: "KF-2012" manufactured by Shin-Etsu Chemical Co., Ltd.

Photopolymerization initiator: "Omnirad 1173" manufactured by IGM

Isocyanate (MDI, 4,4'-diphenylmethane diisocyanate): "Millionate MT" manufactured by Nippon Polyurethane Industry Co., Ltd.

<Surface Treatment of Base Layer>

The surface of the base layer was immersed for 30 seconds in a surface treatment liquid which has been adjusted to 25° C. in temperature, so that a range of 1.0 to 2.0 mm was immersed from the surface of the base layer to the inside in the radial direction. Next, the base layer pulled up from the surface treatment liquid was immersed in pure water which has been adjusted to 25° C. in temperature for 30 seconds for washing. Then, the pure water was removed from the surface of the pulled-up base layer by air, and the base layer was cured by irradiation with ultraviolet rays. After that, the base layer was heated at 110° C. for 2 hours. At this time, wrinkled protruding parts (small protruding parts) were formed on the side surface of the large protruding part in the base layer. Thereby, a developing roll in which the outer circumference of the core metal has an elastic body layer having a predetermined convex-concave shape was produced. Table 2 shows the surface roughness Rz of the side surface of the large protruding part resulted from the small protruding parts in the elastic body layer, the distance $D_2$ between the small protruding parts, the surface roughness Rz of the elastic body layer, and the surface area ratio $S/S_0$ of the elastic body layer.

Comparison Example 1

The same rubber layer as the unpolished rubber layer in Example 1 was used directly without surface treatment to form the elastic body layer of a developing roll.

Comparison Example 2

The same base layer as the base layer having the predetermined large protruding parts in Example 1 was used directly without surface treatment to form the elastic body layer of a developing roll.

Comparison Example 3

A developing roll was produced in the same manner as in Example 1 except that the same base layer as the base layer having the predetermined large protruding parts in Example 1 was surface-treated with a surface treatment liquid comprising isocyanate.

TABLE 1

| | | Example | | | | | | | | | | Comparison example | | | |
|---|---|---|---|---|---|---|---|---|---|---|---|---|---|---|---|
| | | 1 | 2 | 3 | 4 | 5 | 6 | 7 | 8 | 9 | 10 | 1 | 2 | 3 | 4 |
| Surface treatment liquid | Trichloroisocyanuric acid | 4 | 4 | 4 | 4 | 4 | 4 | 4 | 4 | 4 | 4 | — | — | — | — |
| | C = C bond comprising silicone oil | 0.03 | 0.03 | 0.03 | 0.03 | 0.03 | 0.03 | 0.03 | 0.03 | 0.03 | — | — | — | — | — |
| | Photopolymerization initiator | 0.2 | 0.2 | 0.2 | 0.2 | 0.2 | 0.2 | 0.2 | 0.2 | 0.2 | — | — | — | — | — |
| | Tert-butyl alcohol | 60 | 60 | 70 | 60 | 80 | 80 | 90 | 50 | 95 | 80 | — | — | — | — |
| | Ethyl acetate | 40 | — | 30 | — | 20 | — | 10 | 50 | 5 | 20 | — | — | 100 | — |
| | Toluene | — | 40 | — | — | — | 10 | — | — | — | — | — | — | — | — |
| | Methyl ethyl ketone | — | — | — | 40 | — | 10 | — | — | — | — | — | — | — | — |
| | Isocyanate (MDI) | — | — | — | — | — | — | — | — | — | — | — | — | 20 | — |

Comparison Example 4

<Preparation of Resin Particle Dispersion Surface Layer Composition>

100 parts by mass of urethane resin (Nippolan 5199, manufactured by Nippon Polyurethane Industry Co., Ltd.), 10 parts by mass of carbon black (Denka black HS-100, manufactured by Denka Company Limited), and 15 parts by mass of urethane particles with an average particle size of 8 μm ("Art Pearl C800" manufactured by Negami Chemical Industrial Co., Ltd) as particles for forming roughness were kneaded using a ball mill, and then 400 parts by mass of MEK were added and mixed/stirred to prepare a resin particle dispersion surface layer composition.

<Production of Developing Roll>

On the outer circumference surface of the same rubber layer as the unpolished rubber layer in Example 1, the resin particle dispersion surface layer composition was coated by a roll coating method, and then heated at 170° C. for 60 minutes to form a surface layer having a thickness of 3 µm. Thereby, a developing roll having surface convex-concavity resulted from the particles for forming roughness was produced.

The occurrence state of toner filming and the occurrence state of toner fusion were investigated for the produced developing roll.

(Width W of Large Protruding Part)

A laser microscope ("VK-X100" manufactured by Keyence) was used to photograph the surface at a magnification of 3000 at three positions, that is, positions 5 mm inward in the axial direction from both ends of the roll surface respectively and the position of the center in the axial direction. By a plane measurement of a mode, a measurement line was drawn from the vertex point of an arbitrary large protruding part to the bottom point of the adjacent recessed part, and the measured plane distance was doubled and taken as the width of the arbitrary large protruding part. The measurement was carried out for three arbitrary large protruding parts for one location, and the average value of nine points which is a total of three large protruding parts at each of three locations was taken as the width of the large protruding part.

(Height H of Large Protruding Part)

A laser microscope ("VK-X100" manufactured by Keyence) was used to photograph the surface at a magnification of 3000 at three positions, that is, positions 5 mm inward in the axial direction from both ends of the roll surface respectively and the position of the center in the axial direction. By a profile measurement of a mode, a measurement line passing through the vertex point of an arbitrary large protruding part was drawn, height smoothing was performed in the measured height profile to remove noise, and further the slope of the graph was corrected. The vertex point of an arbitrary large protruding part and the bottom point of the adjacent recessed part were selected, and the obtained numerical value of height difference was taken as the height of the arbitrary protruding part. The measurement was carried out for three arbitrary large protruding parts for one location, and the average value of nine points which is a total of three large protruding parts at each of three locations was taken as the height of the large protruding part.

(Interconvex Distance $D_1$ of Large Protruding Part)

A laser microscope ("VK-X100" manufactured by Keyence) was used to photograph the surface at a magnification of 3000 at three positions, that is, positions 5 mm inward in the axial direction from both ends of the roll surface respectively and the position of the center in the axial direction. By a plane measurement of a mode, a measurement line was drawn from the vertex point of an arbitrary large protruding part to the vertex point of the adjacent protruding part, and the measured plane distance was taken as the interconvex distance. The measurement was carried out between three arbitrary large protruding parts for one location, and the average value of nine points which is a total of three large protruding parts at each of three locations was taken as the interconvex distance of the large protruding part.

(Surface Roughness Rz of Side Surface of Large Protruding Part)

a laser microscope ("VK-X100" manufactured by Keyence) was used to photograph the surface at a magnification of 3000 at three positions, that is, positions 5 mm inward in the axial direction from both ends of the roll surface respectively and the position of the center in the axial direction. From the captured image, three arbitrary large protruding parts were selected and the ten-point average roughness Rz of the side surface of the large protruding part was measured by a line roughness measurement of roughness measurement (conforming to JIS B 0601-1994) mode. The average value of nine points which is a total of three large protruding parts at each of three locations was taken as the surface roughness Rz of the side surface of the large protruding part. In addition, the measurement distance was 4 to 6 µm.

(Interconvex Distance $D_2$ of Small Protruding Part)

A laser microscope ("VK-X100" manufactured by Keyence) was used to photograph the surface at a magnification of 3000 at three positions, that is, positions 5 mm inward in the axial direction from both ends of the roll surface respectively and the position of the center in the axial direction. By a profile measurement mode, a measurement line was drawn on the side surface of an arbitrary large protruding part to acquire a profile. Adjacent small protruding parts were selected from the profile, and the plane distance was measured. The measurement was carried out between three arbitrary small protruding parts, and the average value of nine points which is a total of three small protruding parts at each of three locations was taken as the interconvex distance $D_2$ of the small protruding part.

(Surface Roughness Rz of Roll Surface)

A contact type surface roughness meter ("Surfcom 1400D" manufactured by Tokyo Seimitsu Co., Ltd.) was used to measure the ten-point average roughness Rz of twelve points which is a total of four points in the circumferential direction at three positions, that is, positions 5 mm inward in the axial direction from both ends of the roll surface respectively and the position of the center in the axial direction. The average value was taken as the Rz of the roll surface, and the calculation standard was conformed to JIS B 0601-1994. The measurement was carried out with a measurement length of 4 mm and a cutoff wavelength of 0.8 mm.

(Measurement Method of Surface Area Ratio $S/S_0$)

A laser microscope ("VK-X100" manufactured by Keyence) was used to photograph the surface at a magnification of 3000 at three positions, that is, positions 5 mm inward in the axial direction from both ends of the roll surface respectively and the position of the center in the axial direction. By a volume surface measurement of a mode, a surface area S of a range of 0.4 mm$^2$ was obtained, and a result of dividing the surface area S by $S_0$ ($S/S_0$) was taken as the surface area ratio. S is a measured surface area of the elastic body layer, and $S_0$ is a theoretical surface area of the elastic body layer when the surface of the elastic body layer is a flat surface.

(Toner Filming)

A commercially available color laser printer ("MS812dn" manufactured by LEXMARK) is used as an evaluation machine, and the produced developing roll was assembled to the toner cartridge (Bk color). In the image after 10000 sheets endurance in an environment of 23° C.×53% RH, the case in which there was no filming image was regarded as qualified "○", the occurrence of a halftone level streak was regarded as "Δ", and the occurrence of both a solid streak and a halftone streak was regarded as unqualified "x".

(Toner Fusion)

A commercially available color laser printer ("MS812dn" manufactured by LEXMARK) is used as an evaluation machine, and the produced developing roll was assembled to the toner cartridge (Bk color). After a solid image was printed in the environment of 23° C.×53% RH, the toner cartridge was left in an environment of 45° C.×95% for 5 days while being set in the evaluation machine. After being removed from the evaluation machine, the toner cartridge was reassembled to the evaluation machine, and a solid image and a halftone image were printed. The developing roll having no contact marks with a doctor blade, a toner supply roll, and a photoreceptor in the solid image was regarded as qualified "○", and the developing roll having a contact mark in the solid image was regarded as unqualified "x".

and is also subjected to the surface treatment with isocyanate, but no small protruding part is formed on the side surface of the large protruding part formed by polishing, the toner is deposited in the recessed part between the large protruding parts, and toner fusion cannot be suppressed. Surface roughness resulted from particles is formed on the surface of the developing roll (surface layer) of Comparison example 4. However, in the developing roll of Comparison example 4, the toner is deposited in the recessed part

TABLE 2

|  | Example | | | | | | | | | | Comparison example | | | |
| --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 1 | 2 | 3 | 4 |
| Formation of large protruding part | Polish | Polish | Polish | Polish | Polish | Polish | Polish | Polish | Polish | Polish | None | Polish | Polish | Particle |
| Surface treatment (isocyanuric acid) | Yes | Yes | Yes | Yes | Yes | Yes | Yes | Yes | Yes | Yes | None | None | None | None |
| Surface treatment (isocyanate) | None | None | None | None | None | None | None | None | None | None | None | None | Yes | None |
| Width W of large protruding part (μm) | 8.32 | 9.88 | 3.48 | 11.65 | 3.68 | 10.20 | 4.38 | 10.11 | 3.99 | 9.55 | — | 9.22 | 9.78 | — |
| Height H of large protruding part (μm) | 3.57 | 9.52 | 3.95 | 5.60 | 3.55 | 10.22 | 3.15 | 8.99 | 4.76 | 4.23 | — | 9.39 | 8.27 | — |
| Interconvex distance $D_1$ of large protruding part (μm) | 11.88 | 15.20 | 9.14 | 16.59 | 7.95 | 17.28 | 8.29 | 18.29 | 6.72 | 10.29 | — | 12.02 | 13.28 | — |
| Surface roughness Rz of side surface of large protruding part (μm) | 2.94 | 3.92 | 2.16 | 2.97 | 2.55 | 3.29 | 3.78 | 2.91 | 3.28 | 3.22 | — | 1.21 | 1.32 | — |
| Interconvex distance $D_2$ of small protruding part (μm) | 1.10 | 2.37 | 1.83 | 1.49 | 1.29 | 2.36 | 1.36 | 2.63 | 1.36 | 1.46 | — | 0.50 | 0.63 | — |
| Surface roughness Rz of roll surface | 3.89 | 5.28 | 3.11 | 5.11 | 3.27 | 4.89 | 3.12 | 5.09 | 3.33 | 4.26 | 1.92 | 4.05 | 4.11 | 6.76 |
| Surface area ratio $S/S_0$ | 6.82 | 7.58 | 5.19 | 7.56 | 5.22 | 7.83 | 5.13 | 7.59 | 5.29 | 6.87 | 1.01 | 6.35 | 6.28 | 1.41 |
| Toner filming | ○ | ○ | ○ | ○ | ○ | ○ | ○ | ○ | ○ | Δ | x | Δ | Δ | Δ |
| Toner fusion | ○ | ○ | ○ | ○ | ○ | ○ | ○ | ○ | ○ | ○ | ○ | x | x | x |

Surface roughness resulted from polishing, particles, or the like is not formed on the surface of the developing roll of Comparison example 1, and toner filming cannot be suppressed in the developing roll of Comparison example 1. Surface roughness resulted from polishing is formed on the surface of the developing roll of Comparison example 2, but no small protruding part is formed on the side surface of the large protruding part formed by polishing, the toner is deposited in the recessed part between the large protruding parts, and toner fusion cannot be suppressed. The surface of the developing roll (elastic body layer) of Comparison example 3 has surface roughness resulted from polishing between the protruding parts, and toner fusion cannot be suppressed.

From the comparison between the examples and Comparative example 1, it can be seen that toner filming cannot be suppressed unless the elastic body layer is provided with surface convex-concavity. Then, from the comparison between the examples and Comparative examples 2 to 4, it can be seen that toner fusion may not be suppressed even if the elastic body layer is provided with surface convex-concavity. Then, in the examples, small protruding parts are arranged on the side surface of the large protruding part arranged on the surface of the elastic body layer by polishing or the like, the surface roughness of the side surface of the large protruding part is set to a predetermined surface roughness Rz, and thereby even if the toner enters between the large protruding parts, adhesion of the toner is suppressed between the large protruding parts, and toner fusion is suppressed. Further, because the elastic body layer is provided with surface convex-concavity, toner filming is also suppressed. Then, from the comparison between Example 10 and other examples, it can be seen that toner filming is further suppressed by arranging small protruding parts on the side surface of the large protruding part and imparting a silicone group to the surface of the elastic body layer.

Other Configurations

In one embodiment of the disclosure, the developing roll for an electrophotographic device may include a shaft body and an elastic body layer formed on an outer circumference of the shaft body. The surface of the elastic body layer has a plurality of large protruding parts having a width of 3.0 to 12 µm and a height of 3.0 to 12 µm, and a side surface of the large protruding part has a plurality of small protruding parts which form convex-concavities having a ten-point average roughness Rz of 2.0 to 4.0 µm.

In one embodiment, the large protruding part may be a linear protruding part continuous in a circumferential direction. The large protruding part may be a protruding part having a triangular cross section. The small protruding part may include wrinkles formed on the side surface of the large protruding part. Further, the surface of the bottom of a groove between the large protruding part and the large protruding part may have a plurality of small protruding parts which form convex-concavities of Rz 2.0 to 4.0 µm. The distance between the large protruding part and the large protruding part may be 6.0 to 9.0 µm. The distance between the small protruding part and the small protruding part may be 1.0 to 5.0 µm. The surface area ratio $S/S_0$ of the elastic body layer may be 5.0 to 8.0. The surface of the elastic body layer may comprise a compound having an isocyanuric acid skeleton. The elastic body layer may comprise a polymer having a carbon-carbon double bond.

In another embodiment of the disclosure, a method for manufacturing a developing roll for an electrophotographic device may include: a step of forming a base layer, which comprises a polymer having a carbon-carbon double bond and has a plurality of large protruding parts having a width of 3.0 to 12 µm and a height of 3.0 to 12 µm on a surface of the base layer, on an outer circumference of a shaft body; and a step of impregnating the surface of the base layer with chlorinated isocyanuric acid, and curing the surface of the base layer impregnated with the chlorinated isocyanuric acid so as to form a plurality of small protruding parts which form convex-concavities having a ten-point average roughness Rz of 2.0 to 4.0 µm on a side surface of the large protruding part.

According to the developing roll for an electrophotographic device of the present disclosure, because the surface of the elastic body layer has a plurality of large protruding parts having a width of 3.0 to 12 µm and a height of 3.0 to 12 and the side surface of the large protruding part has a plurality of small protruding parts which form convex-concavities having a ten-point average roughness Rz of 2.0 to 4.0 toner fusion and toner filming can be suppressed.

Although the examples of the present disclosure have been described above, the present disclosure is not limited to the above examples, and various modifications can be made without departing from the spirit of the present disclosure.

What is claimed is:

1. A developing roll for an electrophotographic device, comprising:
    a shaft body, and an elastic body layer formed on an outer circumference of the shaft body,
    a surface of the elastic body layer having a plurality of large protruding parts each of which has a width of 3.0 to 12 µm and a height of 3.0 to 12 µm, and a side surface of the large protruding part having a plurality of small protruding parts which form convex-concavities having a ten-point average roughness Rz of 2.0 to 4.0 µm,
    wherein the large protruding part is a linear protruding part continuous in a circumferential direction, and the large protruding part is a protruding part having a triangular cross section,
    the small protruding part includes wrinkles formed on the side surface of the large protruding part,
    a surface of a bottom of a groove between the adjacent large protruding parts further has a plurality of small protruding parts which form convex-concavities of Rz 2.0 to 4.0 µm,
    a distance between the adjacent large protruding parts is 6.0 to 9.0 µm, and a distance between the small protruding part and the small protruding part is 1.0 to 5.0 µm,
    the surface of the elastic body layer comprises a compound having an isocyanuric acid skeleton, and the elastic body layer comprises a polymer having a carbon-carbon double bond, and
    a surface area ratio $S/S_0$ of the elastic body layer is 5.0 to 8.0, in which S: measured surface area of the elastic body layer, and $S_0$: theoretical surface area of the elastic body layer when the surface of the elastic body layer is a flat surface.

* * * * *